(12) United States Patent
Ainasoja

(10) Patent No.: US 7,552,871 B2
(45) Date of Patent: Jun. 30, 2009

(54) METHOD FOR COLLECTING DATA FAST IN INVENTORY SYSTEMS AND WIRELESS APPARATUS THERETO

(75) Inventor: Teemu Ainasoja, Turku (FI)

(73) Assignee: Nordic ID Oy, Salo (FI)

( * ) Notice: Subject to any disclaimer, the term of this patent is extended or adjusted under 35 U.S.C. 154(b) by 50 days.

(21) Appl. No.: 11/641,560

(22) Filed: Dec. 19, 2006

(65) Prior Publication Data

US 2008/0142590 A1    Jun. 19, 2008

(51) Int. Cl.
*G06F 19/00* (2006.01)
*G06Q 30/00* (2006.01)
*G06Q 90/00* (2006.01)

(52) U.S. Cl. .................. 235/385; 235/375; 235/487

(58) Field of Classification Search .......... 235/385, 235/487, 375, 383; 705/28, 22
See application file for complete search history.

(56) References Cited

U.S. PATENT DOCUMENTS

| | | | |
|---|---|---|---|
| 6,501,832 B1* | 12/2002 | Saylor et al. | 379/88.04 |
| 6,594,632 B1* | 7/2003 | White | 704/270 |
| 6,920,431 B2* | 7/2005 | Showghi et al. | 705/26 |
| 2002/0143540 A1* | 10/2002 | Malayath et al. | 704/256 |
| 2003/0120626 A1* | 6/2003 | Piotrowski | 707/1 |
| 2006/0065723 A1* | 3/2006 | Palmquist | 235/383 |
| 2006/0178947 A1* | 8/2006 | Zsigmond et al. | 705/26 |
| 2007/0190982 A1* | 8/2007 | Le Faucheur | 455/414.1 |

\* cited by examiner

*Primary Examiner*—Edwyn Labaze
(74) *Attorney, Agent, or Firm*—Alfred A. Fressola; Ware, Fressola, Van Der Sluys & Adolphson LLP

(57) ABSTRACT

A method and portable terminal device for collecting data of product items. After the user has counted a number of product items belonging to same product identifier he/she stores the counted number of product items to the terminal device by a voice command. The updated inventory data is then stored to the inventory file of the inventory system using the portable terminal device immediately or afterwards. In addition or alternatively, another voice command is used in initiating the reader to read the product identifier. In addition or alternatively, still another voice command is used to transfer the number of identified products linked to the corresponding product identifiers between the terminal device and the inventory system file. This provides a fast and reliable way of collecting data of products in the inventory systems and also a fast and reliable way of updating information of inventory files in the inventory systems.

18 Claims, 4 Drawing Sheets

METHOD FOR COLLECTING DATA FAST IN INVENTORY SYSTEMS AND WIRELESS APPARATUS THERETO

TECHNICAL FIELD OF THE INVENTION

This invention relates generally to collect data of products in inventory systems, and more particularly to a method for collecting product related data in a fast way in inventory systems in which a wireless terminal is used as a platform to identify, collect and display the product related data. This invention also relates to a portable wireless apparatus for identifying, collecting and displaying product related data in a fast way in inventory systems.

BACKGROUND OF THE INVENTION

There is a need in inventory systems that are used in warehouses, stores, shops or other similar premises to have a fast way of collecting information about product items sited in such premises. This information is collected for the purpose to take inventory of product items to keep an inventory management system up-to-date. Typically, terminal devices are used to help collect information relating to products, e.g. product type, a number of products, etc. Terminal device typically includes a reader device to identify the product item, e.g. by reading a bar code or RFID tag being located adjacent to the product item.

One way to acquire product related data is that a collector person recognizes a product item, reads a product code, counts a number of the product items and manually writes down the product code together with the number of the products on the piece of paper. Then afterwards the collected information is entered into the computer of the inventory system and the system will be updated. Another way to acquire product related data is that beforehand there is printed from the inventory system a list of product items or codes together with the number of product items stored in the inventory system at the moment of printing. Then the collector person identifies the product item, counts the number of each product items and marks to the list manually only those numbers of the products that differ from the numbers on the list. Then afterwards the collected updated information is entered into the computer of the inventory system so that the system will be updated.

Referring to FIG. 1 there is depicted an inventory method that is known. A person who is drawing up an inventory of products carries a portable terminal device which is capable of reading a bar code tag that identifies product item. The user activates the device by pressing a scan mode button on (step 111) enabling the device to read bar code of product item. Then according to step 112 the user counts a number of similar product items and inputs the counted number of product items by keying in the number to the keyboard of the device. The number of product items is also displayed on the screen of the device according to step 113 so that the user can check that the written number is correct. After checking the number the user can store the number to a memory of the device by pressing a store mode button on as shown in step 115 and then afterwards the user can store the number to a database of the inventory system. There is a further possibility, as shown in steps 121-125, when the user who is drawing up inventory of products carries a wireless terminal device which is capable of reading a bar code tag and communicating with the database of the inventory system. Then the user can activate the device by pressing a scan mode button on (step 111) enabling the device to read bar code of product item and pressing a transfer mode button on to communicate with the inventory system according to step 121. When the bar code is read the terminal device is able to receive a number of product items related to the read bar code according to step 123 and this received number is called a reference number of product items which reference number shows the latest number of product items that has been stored to the database of the inventory system. This reference number is then displayed on the screen of the device according to step 124. After counting the number of product items related to the read bar code (step 112) the user can compare the counted number to the reference number shown on the screen in step 125 and if the numbers are the same he/she can acknowledge receipt and store the number to a memory of the device by pressing a store mode button on as shown in step 115. Then afterwards the user can store the number to the database of the inventory system from the memory of the device to update the inventory system. After comparing the counted number to the reference number according to step 125 and if the numbers are different he/she can key in the counted number according to steps 113-114 or correct the refrence number shown on the screen to correspond to the counted number by pressing ± keys so many times as required. Then he/she stores the number to the memory of the device by pressing a store mode button on as shown in step 115. Then afterwards he/she can update the inventory system by transferring and storing the number to the database of the inventory system.

When the number of product items is counted in the known inventory systems, it is quite time-consuming to key in the counted number to the terminal device by pressing the key buttons and check on the screen of the device that the entered number is correct one. If the entered number is not correct, the user has to repeat to key in a correct number. Even if the reference number of product items from the inventory system is automatically available on the screen, there still is a need for the user to verify the counted number and the reference number and then either to press an acknowledge key if verified numbers are the same or to key in the counted number by pressing key buttons and once again check on the screen that the entered number was correct one. Then the user stores the counted number to the memory of the device by pressing a store button, and finally he may later update the database of the inventory system by pressing a relevant button key to do that. The steps of punching the buttons on the keyboard, verifying numbers on the screen and correcting wrong key entries are rather time-consuming steps in taking an inventory and provides high duty of care from the employee that a realible update of the inventory system would be achieved as a result.

The problems set forth above are overcome by providing a method and a portable apparatus for taking an inventory wherein the time-consuming steps mentioned above are eliminated or diminished from the point of the user. This also facilitates the steps of taking the inventory and thus increases the realibility of keeping the inventory system up-to-date.

SUMMARY OF THE INVENTION

It is an objective of the invention to provide a method for taking an inventory by shortening a time that is spent to collect data of product items belonging to the inventory system. It is also an objective of the invention to provide a portable terminal device for collecting data of product items which device shortens a time spent in taking an inventory of the inventory system.

The objectives of the invention are achieved by providing a method and portable terminal device for collecting data of product items wherein after the user has counted a number of product items belonging to the same product identifier he/she stores the counted number of product items to the terminal device by a voice command. The updated inventory data is then stored to the inventory file of the inventory system using the portable terminal device immediately or afterwards. Previous solutions comprising rather time-consuming steps of keying in functions using keyboard buttons, verifying numbers on the screen and correcting faulty key entries are diminished or completely eliminated and therefore solutions according to the invention provide faster and more reliable way of collecting data of products in the inventory systems and consequently faster and more reliable way of updating information of inventory files in the inventory systems.

The invention provides a method for collecting product data in an inventory system, which method comprises identifying a product identifier belonging to the inventory system, receiving a voice command to input a number of identified products, verifying the voice command to a plurality of predefined reference voice images to recognize the voice command, and storing the number of identified products linked to the corresponding product identifier. According to an embodiment of the invention, identifying the product identifier is initiated by receiving another voice command to read the product identifier. According to another embodiment of the invention, transferring the accumulated number of identified products linked to the corresponding product identifiers between a memory of the inventory system and a local memory of the terminal device is initiated by receiving another voice command.

The invention also provides a portable apparatus for collecting data in an inventory system, where the apparatus comprises a reader means arranged to identify a product identifier belonging to the inventory system, a voice receiving means arranged to receive a voice command to input a number of identified products, a voice recognition means arranged to verify the voice command received from the voice receiving means to a plurality of predefined reference voice images to recognize the voice command, and a memory means connected to the voice recognition means and to the reader means, the memory means arranged to store the number of identified products linked to the corresponding product identifier. According to an embodiment of the invention the voice receiving means is arranged to receive another voice command to read the product identifier. According to another embodiment of the invention the voice receiving means is arranged to receive another voice command to transfer the accumulated number of identified products linked to the corresponding product identifiers between a memory of the inventory system and a local memory of the terminal device.

Other further embodiments of the invention are presented in dependent claims.

BRIEF DESCRIPTION OF THE DRAWINGS

An embodiment of the invention will be described in detail below, by way of example only, with reference to the accompanying drawings, of which

DETAILED DESCRIPTION OF THE INVENTION

Figure 1:
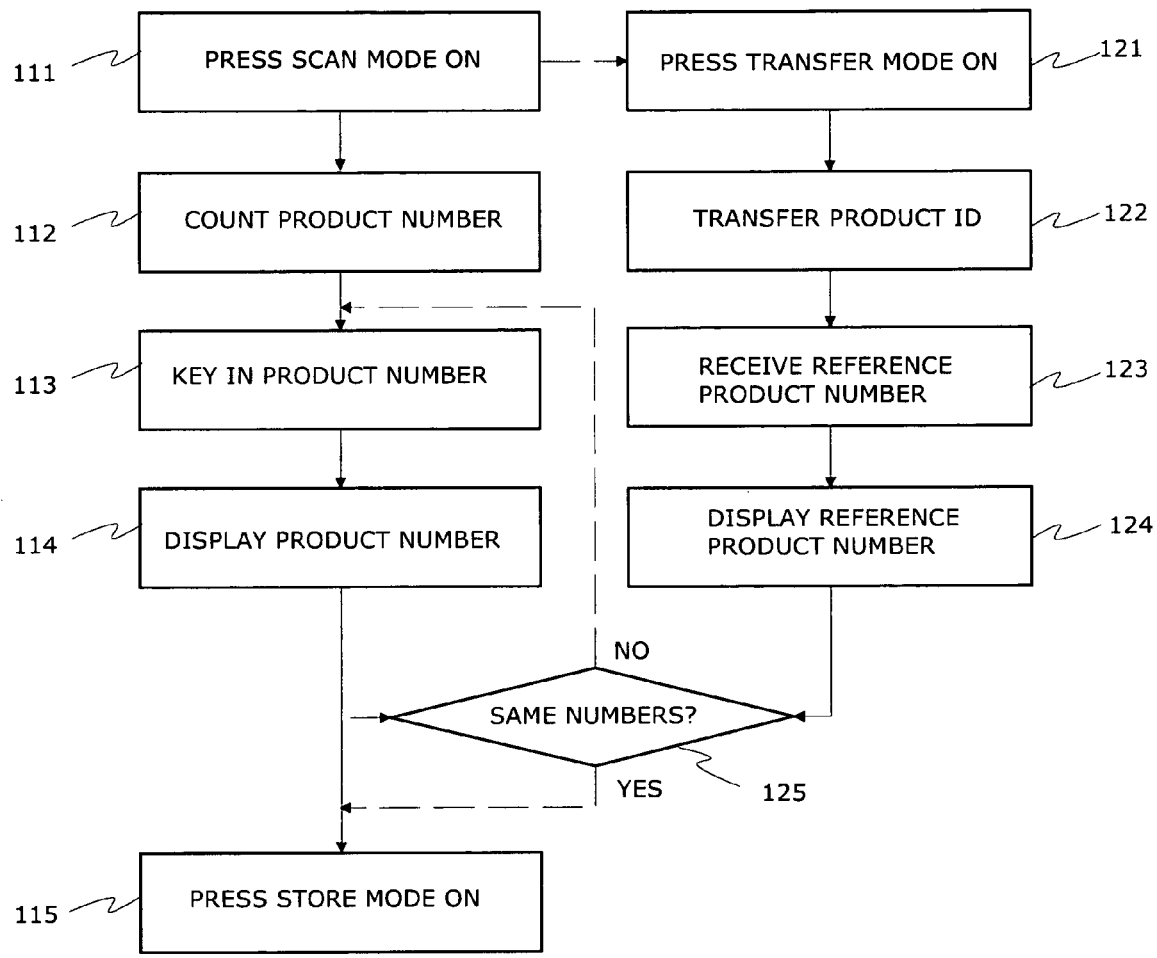
FIG. 1 depicts a flow diagram of a known method for collecting data in the inventory system.

A description of FIG. 1 was given earlier in connection with the description of the state of art.

It would be advantageous to have a fast and reliable way to update the inventory system which is used to manage a large amount of object related information which in turn is related to a large amount of different kinds of objects. An inventory is understood as a "list" of all the objects, e.g. products, articles, services or alike, in a particular physical location, e.g. building, warehouse, stock, shop, or virtual location, e.g. memory, database, etc. The process of making a list of all the objects in such locations can be called inventory taking or inventorying. Information of the objects is collected to keep the "list" i.e. inventory management system up-to-date. This collected information can also be used when handling product orders, collecting products, delivery of products or reception of products, etc.

A portable apparatus, preferably a portable terminal device, is used to help collecting data of the inventory to keep the inventory system updated. The terminal device comprises at least means for identifying the object, e.g. a reader to identify a product item, a display screen, and memory and processing capacity either in the device itself or a connection to the such capacity outside the device. Further the terminal device comprises voice receiving means, e.g. a microphone, or an interface connection to such means and voice recognition capability in the device itself or a connection to such capability. Optionally, the terminal device may a wireless terminal device that comprises means for communicating which allows one-way or two-way wireless communication between the terminal device and other parts of the inventory system.

Figure 2:
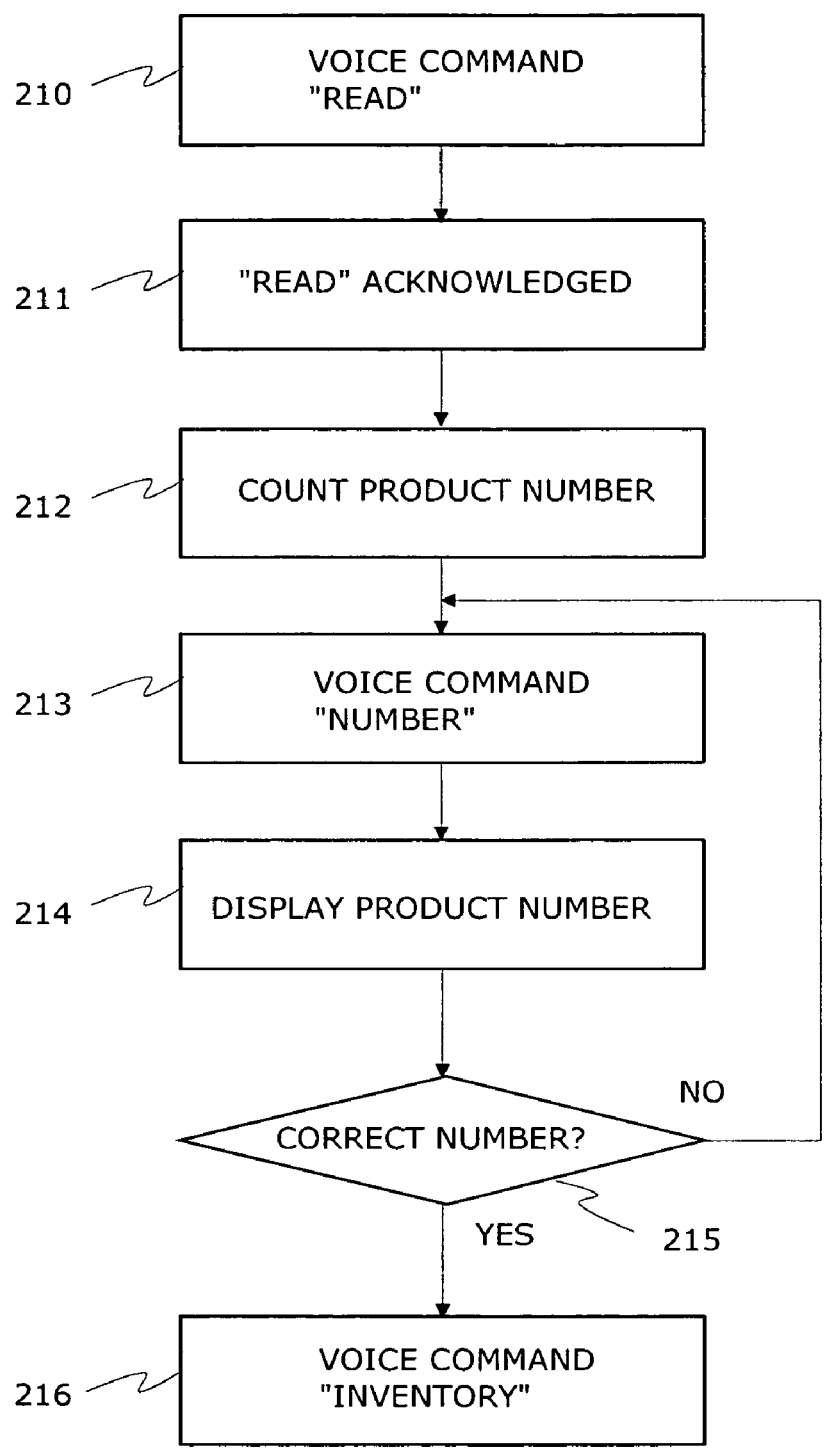
FIG. 2 depicts a flow diagram of an embodiment of a method for collecting data in the inventory system according to the invention.

FIG. 2 depicts a flow diagram of an embodiment of a method for collecting data in the inventory system according to the invention. In step 210 a voice command is given by the user of the portable terminal device to activate a function mode of the device. In this example, when the user says aloud e.g. the word "read" the terminal device is set to reading mode and then the reader device starts to identify the product. After the reader identifies the product in step 211 the terminal device may acknowledge this by giving an audible signal and/or displaying the identifier of the product, e.g. product code, product name or alike, on the screen of the device. In step 212 the user of the device counts how many identified products are found in the location and then according to step 213 he/she says aloud this number of products, e.g. 1, 2, etc., to the terminal device. A function associated with the voice command "number", e.g. "one", "two", etc., evokes in this example the number of counted products to be displayed on the screen of the terminal device (step 214). Now the user can check from the screen if the voice command was correctly entered the terminal device or not. If the voice command was correctly entered the terminal device then in step 216 he/she can store the number of products into the memory of the device by giving a voice command e.g. "inventory". Alternatively this voice command can store the number of products directly into the memory file of the inventory system. If the voice command was not correctly entered the terminal device the user gives a new voice command "number" and the steps 213-215 are repeated. Repeating steps 210-216 product related data are collected from different products so that the number of each product item is stored to be tied to the identifier of that product item. Same interlinking applies to all other collected data which relates to each product item.

There are several options to proceed the process of collecting data in step 213, when saying the command "number". The function associated with the voice command "number" may also include a function of storing the number of products to the memory of the terminal device. In this embodiment then in step 216 a voice command e.g. "inventory" may cause a function in which the product related data stored in the memory of the device is transferred to the memory file of the inventory system. According to this embodiment steps 210-213 are repeated for different kinds of products and all the data collected is accumulated to the memory of the device and then at the end of the process all the collected data is transferred in step 216 to the inventory system. Alternatively in this embodiment steps 214 and 215 can also be omitted which makes the process faster but may prejudice reliability. Alternatively the function associated with the voice command "number" in step 213 may also include a function of storing the number of products directly into the memory file of the inventory system after each repeated cycle of steps 210-213. In this other embodiment steps 214-216 can also be omitted which makes the process faster but may prejudice reliability.

Voice command features are carried out by means of a software program that listens to the voice receiving means, e.g. the microphone, and recognises predefined voice commands. Each voice command is associated with a certain function which is carried out by saying the voice command. The software program can be programmed, e.g. by teaching, to recognise a certain number of predefined voice commands (1-N) which are assigned to certain predefined functionality. Each predefined voice command can replace for example a keystroke or a series of keystrokes or the voice command can start running an independent software program. As an example, a voice command "one" corresponds to (and replaces) a keystroke of digit key 1 on the keyboard, voice command "two" corresponds to keystroke of digit 2, etc. As another example, a voice command "read" corresponds to (and replaces) a keystroke of scan button on the keyboard, i.e. the voice command "read" starts a scanning program of the reader device. As still another example, a voice command "inventory" can be programmed to start customer's inventory program. It is known to a skilled person that any spoken word could be defined to associate with any chosen functionality that is stored in the memory of the device or system. It is known to the skilled person that any spoken word in any language or gibberish would be applicable. These functions are typically defined by operating systems and/or separate software programs.

For recognising a given voice command there is generated for each voice command a reference image that is stored in the memory where the software program is running. The reference image is composed of a plurality of sequential voice samples of the voice command. Each voice sample includes relative voice intensity in different frequency ranges. Each reference image of the voice command corresponds certain predefined operational function. All reference images are stored in the memory as well as a functional block with which each reference image is programmed to associate. The functional block comprises means for performing the functions that are executed when a voice command, or more precisely a reference image recognised, associated with this functionality is given.

Figure 3:
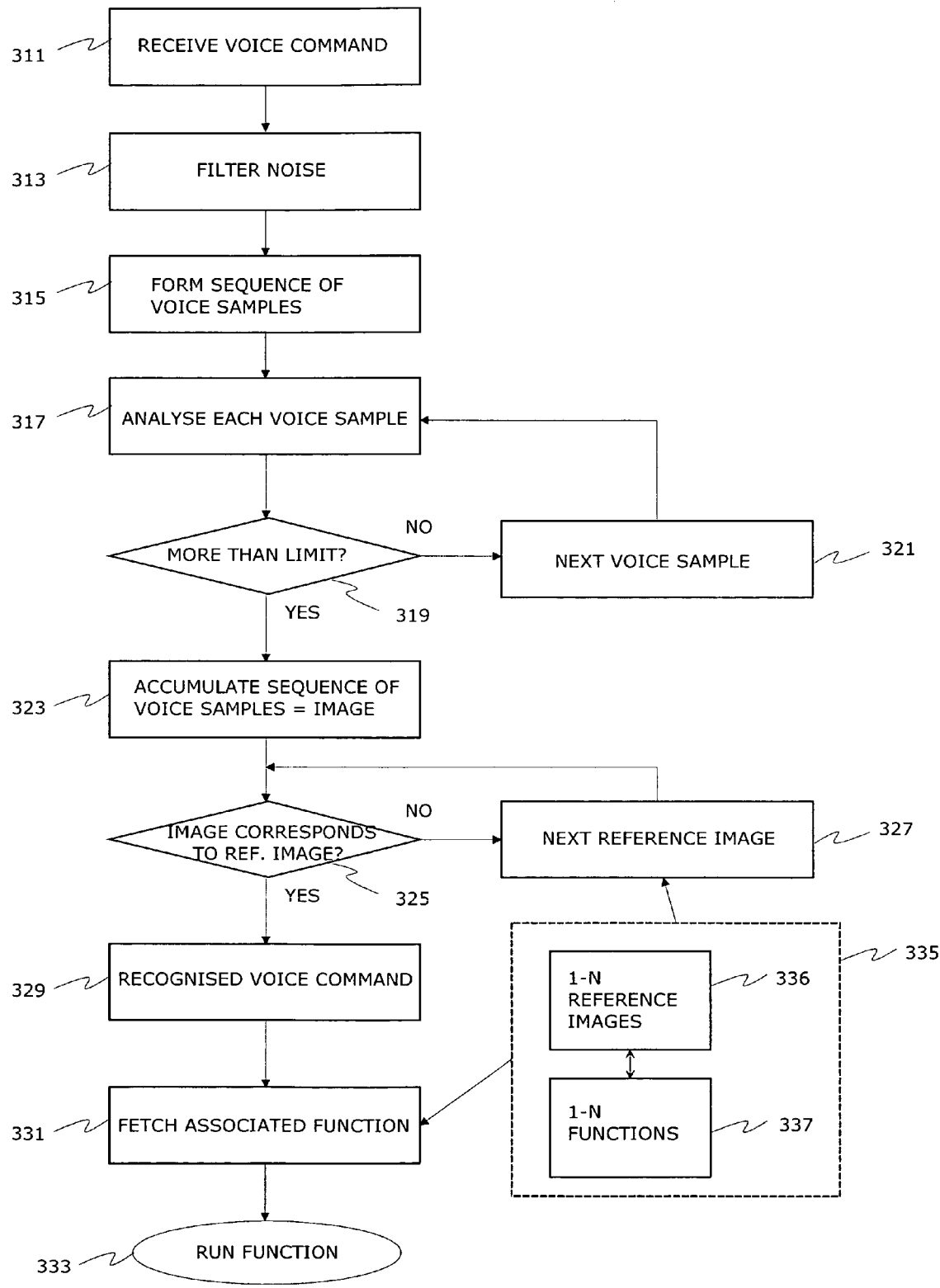
FIG. 3 depicts a flow diagram of an embodiment of a method for collecting data in the inventory system according to the invention.

FIG. 3 depicts more detail as to how a voice command is recognised and associated with function of operation in a form of a flow diagram according to an embodiment of a method of collecting data in the portable terminal device.

Steps 311-337 explained next in this description in accordance with FIG. 3 are applicable in steps 210, 213 and 216 described in FIG. 2.

In FIG. 3 after receiving a voice command via e.g. a microphone according to step 311 a background noise is filtered from the voice command in step 313. Then in step 315 the filtered voice command is divided into series of voice samples according to a predefined rule to form a sequence of voice samples which corresponds to the original voice command as precise as possible. Next each of the voice samples in the sequence is analysed according to predefined criteria. This criteria may exemplary include relative voice intensity in different frequency ranges. There is defined a certain limit value which best serves as the predefined criteria when analysing each voice sample in the sequence of voice samples in step 317. If relative voice intensity of the voice sample is used the limit value, then in step 317 relative voice intensity of each voice sample is measured and the measured value is compared to the limit value in step 319. If the voice intensity of the voice sample is less than the limit value the voice sample is discarded, and a next voice sample in the sequence of voice samples is measured according to steps 321 and 317. If the measured voice intensity of the voice sample exceeds the limit value in step 319, the voice sample is accumulated to a new series of voice samples where each voice sample has passed the limit criteria and finally there is generated a new sequence of voice samples according to step 323. This new sequence of voice samples is called a voice image of the the original voice command and it relates to the original voice command. Next in step 325 the voice image is verified to a reference image that is stored in a memory block 336 residing in the memory 335 of the device or alternatively in the memory 335 of the inventory system file. If the voice image does not correspond to a first reference image, a second reference image is fetched for verification, etc. according to steps 325 and 327. The verification step can be repeated for 1-N reference images residin in the memory. When the voice image corresponds to the reference image in step 325 the original voice command is recognised, i.e. the voice image of the original voice command is the same as the reference image found from the memory. Then the recognised voice command in step 329 is interpreted to be the reference image found in step 325, and next in step 331 a function associated with this reference image is fetched from a function block 337 residing in the memory 335 of the device or alternatively in the memory 335 of the inventory system file. Now the operational function associated with the reference image is completed according to step 333.

According to another embodiment of the invention some of the 1-N reference images can be programmed to be in active state and/or some others to be in passive state. The active state can be understood to mean that in steps 325 and 327 those reference images that are "coded" active are used first or that only those reference images that are "coded" active are used. The passive state can be understood to mean that those reference images that are "coded" passive are used last or omitted or skipped over in the steps 325 and 327. The reference images that are not coded at all are performed otherwise normally but after those that are "coded" active and before those that are "coded" passive. In this way the step of verification the voice image and the reference image is accelerated and therefore the recognition steps 311-331 are performed faster. This also means that the whole process of collecting data is faster. Voice commands, or more precisely reference images, can be defined active and/or passive depending on a device mode in use or a program mode running. For example, if the portable terminal device is in a device mode in which the bar code reader is unable to read bar codes, then a voice command meaning "read" can be defined to be in the active state. This enables that the reference image corresponding the command "read" is recognised very fast. Another example can be that if a software program is in a wait mode in which the program waits to input figures, then only voice commands meaning "one", "two", etc. can be defined to be in the active state, and thus the reference images corresponding to said figure commands are recognised faster.

Figure 4:
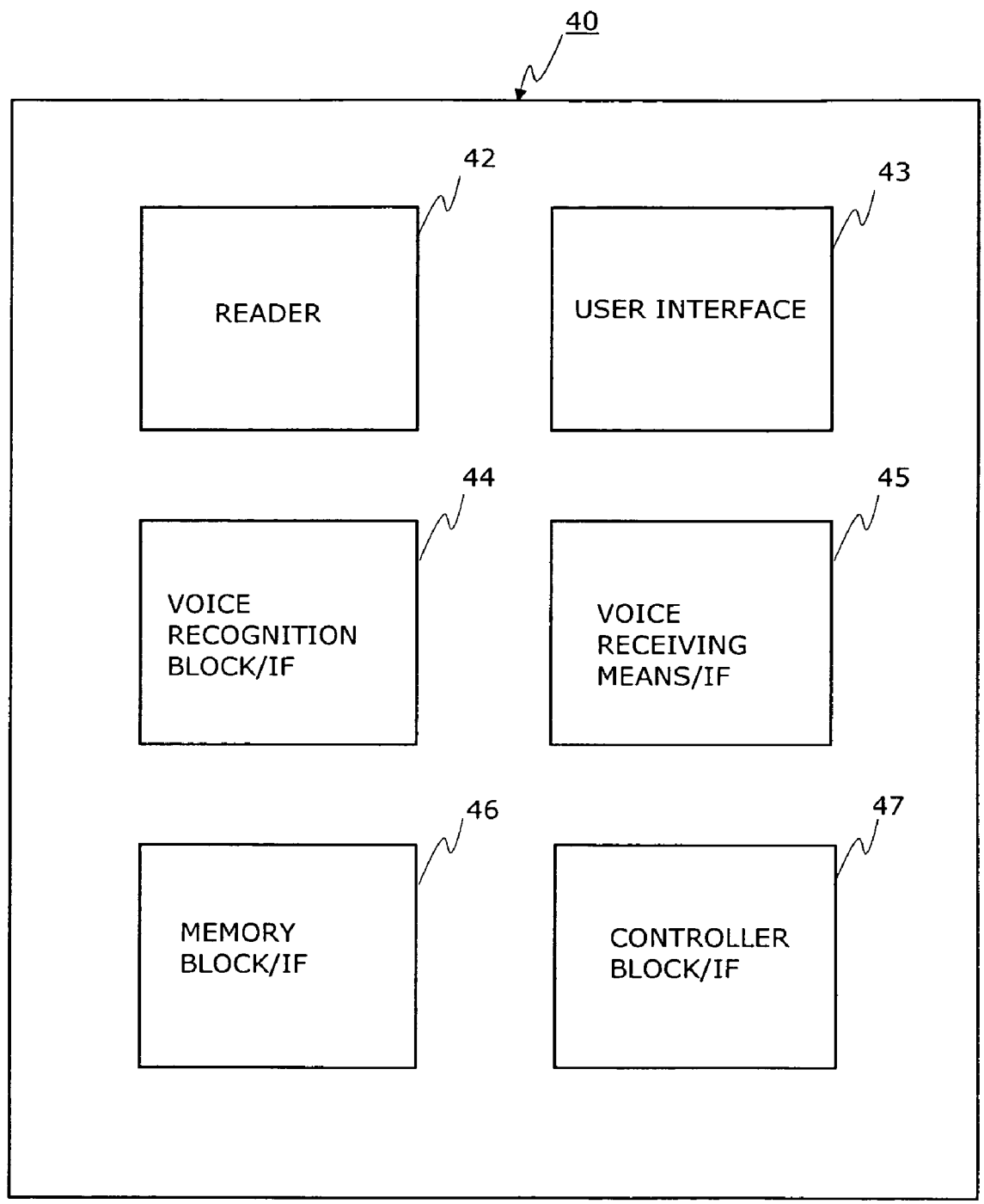
FIG. 4 depicts a block diagram of an embodiment of a portable terminal device for collecting data to update data in the inventory system according to the invention.

The invention also concerns a portable apparatus, preferably wireless terminal device, which is used to help collect data of the inventory to keep the inventory system updated. As shown in FIG. 4 the terminal device 40 comprises at least identifier block 42 to identify the object, e.g. a reader to identify a product item, an optional user interface 43, memory block/interface 46 and controller block/interface 47. The user interface 43 can comprise a display screen, a loudspeaker or a keyboard or any combination of them. The user interface 43 can be used to display any product related data and/or to acknowledge voice commands given, as exemplary shown in steps 211 and 214 of FIG. 2. The identifier block 42 can comprise a reader or scanning device capable of identifying optical tags, e.g.bar codes, or radio frequency identifiers (RFID) or other such identifier tags. Memory block 46 comprises a memory in the terminal device 40 itself or an interface in the terminal device to external memory outside the device or both a memory and a memory interface. The terminal device 40 further comprises voice receiving means/interface 45, e.g. a microphone or an interface 45 to external microphone for receiving a voice command according to step 311 in FIG. 3. The terminal device 40 also comprises a voice recognition block 44 or an interface 44 to external voice recognition controller. The voice recognition block 44 performs the recognition of the voice command as indicated by steps 313-329 in FIG. 3. As described earlier for each voice command there is generated a reference image that is composed of a plurality of sequential voice samples of the voice command. Each voice sample is based on relative voice intensity in different frequency ranges. Each reference image of the voice command is defined to correspond a certain function of operation. All reference images and functional blocks that they associated with are stored in the memory block 46 residing either in the terminal device 40 or the inventory system file. The controller block 47 comprises means for performing the functions that are executed when a voice command, or more precisely a reference image, associated with this functionality is given.

According to another embodiment of a portable terminal device there is further provided a communication block (not shown in FIG. 4) enabling the terminal device 40 to communicate directly with other communication means of the inventory system. This communication may be either wireless or wireline. The communication block may comprise a wireless transmitter or transmitter/receiver to enable wireless communication between the communication block and the receiver/transmitters used in the inventory system. Then certain voice commands, more precisely reference images, can be associated with functional blocks that are defined to perform functions between the interface blocks 44, 46, 47 of the terminal device 40 and other parts of the inventory system such as inventory file in the database, external processor block, external voice recognition block or external controller block, accordingly. As an example, a voice command "inventory" can be programmed to start customer's inventory program in the inventory file and/or to update the inventory file by transmitting all the collected data related to different product items as explained in FIG. 2 in step 216. As another example, a voice command "number" can be programmed to start customer's inventory program in the inventory file and/or to update the inventory file by transmitting the collected data related to each product item as explained in FIG. 2 in step 213. The wireless receiver of the device 40 may receive from the inventory file previous data relating to each product item after identifying the product item and so on the screen the data, e.g. number of product items, before the user start counting according to step 212 in FIG. 2. If a loud speaker is added to the terminal device 40 then this received data can be a voice message, e.g. saying aloud the number of the product items previously stored into the inventory file.

While this invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for collecting product data in an inventory system, comprising
   identifying a product identifier belonging to a product in the inventory system,
   receiving a voice command to evoke a certain function associated with a predefined reference voice image,
   verifying the voice command to a plurality of the predefined reference voice images to recognize the voice command, and
   performing the function associated with the voice command including at least inputting a number of identified products and storing the number of identified products linked to the corresponding product identifier; and
   forming the received voice command to a sequence of voice samples wherein each voice sample is compared to a predefined limit of voice intensity and if exceeding the limit the voice sample is accumulated to another sequence of voice samples forming an image of the voice command.

2. A method according to claim 1, wherein identifying the product identifier is initiated by receiving another voice command to read the product identifier.

3. A method according to claim 2, further comprising acknowledging the product identifier after successfully completing the identifying step.

4. A method according to claim 1, wherein the step of storing the number of identified products linked to the corresponding product identifier accumulates numbers of identified products for each different product identifier to a memory.

5. A method according to claim 4, comprising receiving another voice command to transfer the accumulated number of identified products linked to the corresponding product identifiers between a memory of the inventory system and a local memory of the device.

6. A method according to claim 1, further comprising checking the number of identified products after successfully completing the verifying the voice command wherein checking includes displaying the number of identified products.

7. A method according to claim 1, wherein the image of the voice command is verified to a plurality of predefined reference voice images and if any of the reference voice images corresponds to the image the voice command is recognized.

8. A method according to claim 1, wherein a plurality of predefined reference voice images are programmed to a memory and wherein each reference voice image is programmed to associate a predefined function of operation.

9. A portable apparatus for collecting data in an inventory system, the apparatus comprising
- a reader means arranged to identify a product identifier belonging to a product in the inventory system,
- a receiving means arranged to receive at least one voice command to evoke a certain function associated with a predefined reference voice image,
- a voice recognition means arranged to verify the voice command received from the receiving means to a plurality of the predefined reference voice images to recognize the voice command, and
- means for performing the function associated with the voice command including at least a memory means connected to the voice recognition means and to the reader means, the memory means arranged to receive a number of identified products and store the number of identified products linked to the corresponding product identifier;
- wherein the voice recognition means is arranged to form the received voice command to a sequence of voice samples, to compare each voice sample to a predefined limit of voice intensity and, if the voice sample exceeds the limit, to accumulate another sequence of voice samples to form an imaqe of the voice command.

10. An apparatus according to claim 9, wherein the receiving means is arranged to receive another voice command to read the product identifier.

11. An apparatus according to claim 9, further comprising a user interface arranged to display the number of identified products and the corresponding product identifier.

12. An apparatus according to claim 9, further comprising a signalling means arranged to acknowledge a successful completion of operation.

13. An apparatus according to claim 9, wherein the memory means comprises a memory in the inventory system file, the apparatus further comprising a transfer means arranged to transfer data between the memory interface of the apparatus and the memory of the inventory system.

14. An apparatus according to claim 13, wherein the transfer means comprises a wireless transmitter-receiver.

15. An apparatus according to claim 9, wherein the voice recognition means is arranged to verify the image of the voice command to a plurality of predefined reference voice images and to recognize the voice command if any of the reference voice images corresponds to the image.

16. An apparatus according to claim 9, wherein the memory means is arranged to store a plurality of predefined reference voice images and a plurality of predefined functions of operations associated to each reference voice image of the plurality of predefined reference voice images.

17. An apparatus according to claim 9, wherein the reader means is arranged to identify optical product identifiers.

18. An apparatus according to claim 9, wherein the reader means is arranged to identify radiofrequency product identifiers.

* * * * *